United States Patent
Maze et al.

(10) Patent No.: US 9,162,747 B2
(45) Date of Patent: Oct. 20, 2015

(54) METHOD FOR MANUFACTURING A SOUND ATTENUATION PANEL

(71) Applicant: Aircelle, Gonfreville l'Orcher (FR)

(72) Inventors: Franck Maze, Le Havre (FR); John Moutier, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 35 days.

(21) Appl. No.: 14/093,749

(22) Filed: Dec. 2, 2013

(65) Prior Publication Data
US 2014/0083798 A1 Mar. 27, 2014

Related U.S. Application Data

(63) Continuation of application No. PCT/FR2012/051067, filed on May 14, 2012.

(30) Foreign Application Priority Data

Jun. 1, 2011 (FR) ...................................... 11 54808

(51) Int. Cl.

| | |
|---|---|
| B64D 33/02 | (2006.01) |
| B29C 51/14 | (2006.01) |
| B64C 1/40 | (2006.01) |
| B32B 3/12 | (2006.01) |
| F02K 1/82 | (2006.01) |

(Continued)

(52) U.S. Cl.
CPC ... B64C 1/40 (2013.01); B32B 3/02 (2013.01); B32B 3/12 (2013.01); B64F 5/00 (2013.01); F02C 7/045 (2013.01); F02K 1/827 (2013.01); G10K 11/168 (2013.01); *B32B 2260/023* (2013.01); *B32B 2260/046* (2013.01); *B32B 2307/102* (2013.01); *B32B 2605/18* (2013.01); *Y02T 50/672* (2013.01)

(58) Field of Classification Search
USPC ................. 181/290, 292, 296, 288, 214, 210; 244/53 B; 156/197, 196, 212
See application file for complete search history.

(56) References Cited

U.S. PATENT DOCUMENTS 4,258,823 A * 3/1981 Ganz et al. ..................... 181/214
4,361,613 A * 11/1982 Bogner et al. ................. 428/119

(Continued)

FOREIGN PATENT DOCUMENTS

| EP | 1398472 A1 | 3/2004 |
|---|---|---|
| EP | 1889713 A2 | 2/2008 |

(Continued)

OTHER PUBLICATIONS

PCT/FR2012/051067 International Search Report.

*Primary Examiner* — Edgardo San Martin
(74) *Attorney, Agent, or Firm* — Brinks Gilson & Lione

(57) ABSTRACT

The present disclosure provides a method for manufacturing a sound attenuation panel having a first cellular core structure and a second cellular core structure joined in a junction area (J). The method includes: a) a joining edge of the first cellular core structure is joined to a corresponding joining edge of the second cellular core structure, thereby forming the junction area; b) the first cellular core structure and the second cellular core structure are placed between an inner skin and an outer skin of the panel.

In particular, the method further has a step prior to step a), in which one junction reinforcement is inserted between the joining edge of the first cellular core structure and the corresponding joining edge of the second cellular core structure in the junction area.

12 Claims, 4 Drawing Sheets

(51) Int. Cl.
   *G10K 11/168* (2006.01)
   *F02C 7/045* (2006.01)
   *B64F 5/00* (2006.01)
   *B32B 3/02* (2006.01)
   *B64D 33/00* (2006.01)

(56) References Cited

U.S. PATENT DOCUMENTS

| | | | | |
|---|---|---|---|---|
| 4,716,067 A | * | 12/1987 | Moji et al. | 428/117 |
| 4,806,077 A | * | 2/1989 | Bost | 416/226 |
| 5,558,919 A | * | 9/1996 | Toni et al. | 428/116 |
| 5,776,579 A | * | 7/1998 | Jessup et al. | 428/73 |
| 5,938,875 A | * | 8/1999 | Jessup et al. | 156/79 |
| 6,039,832 A | * | 3/2000 | McCarville | 156/292 |
| 6,565,942 B2 | * | 5/2003 | Anderson et al. | 428/73 |
| 6,945,111 B2 | * | 9/2005 | Georgeson | 73/600 |
| 7,296,655 B2 | * | 11/2007 | Costa et al. | 181/210 |
| 7,296,656 B2 | * | 11/2007 | Sanicki et al. | 181/210 |
| 7,431,196 B2 | * | 10/2008 | Eilert et al. | 228/181 |
| 7,797,809 B2 | * | 9/2010 | Costa et al. | 29/458 |
| 7,798,285 B2 | * | 9/2010 | Chiou et al. | 181/213 |
| 7,866,440 B2 | * | 1/2011 | Douglas | 181/213 |
| 8,251,174 B2 | * | 8/2012 | Welch et al. | 181/292 |
| 8,579,076 B2 | * | 11/2013 | Ayle et al. | 181/229 |
| 2011/0232991 A1 | * | 9/2011 | Welch et al. | 181/213 |
| 2014/0202789 A1 | * | 7/2014 | Heurtaux et al. | 181/292 |

FOREIGN PATENT DOCUMENTS

| | | |
|---|---|---|
| WO | 2008/113904 A2 | 9/2008 |
| WO | 2010/089471 A1 | 8/2010 |

* cited by examiner

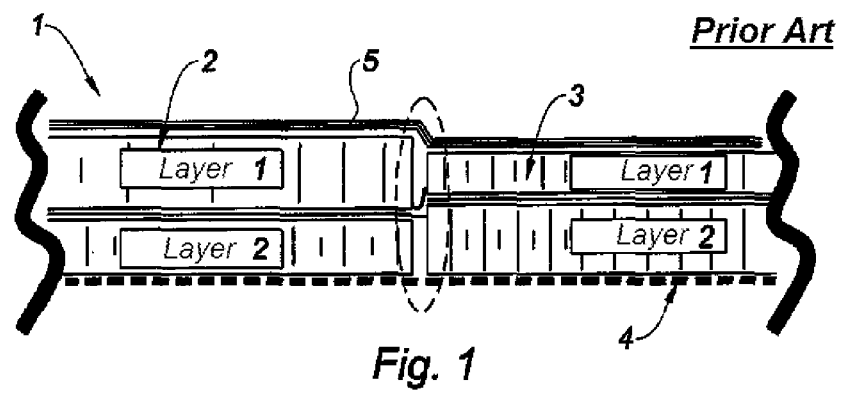
Fig. 1 *Prior Art*
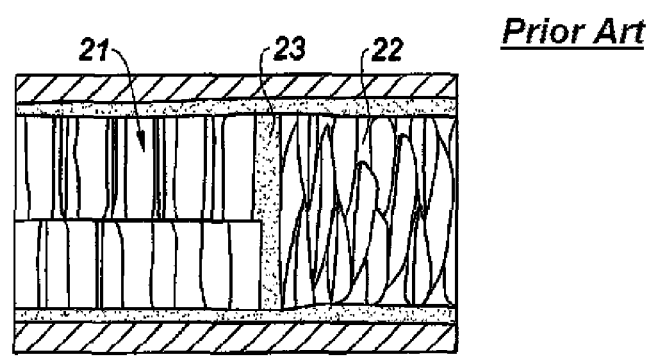
Fig. 2 *Prior Art*
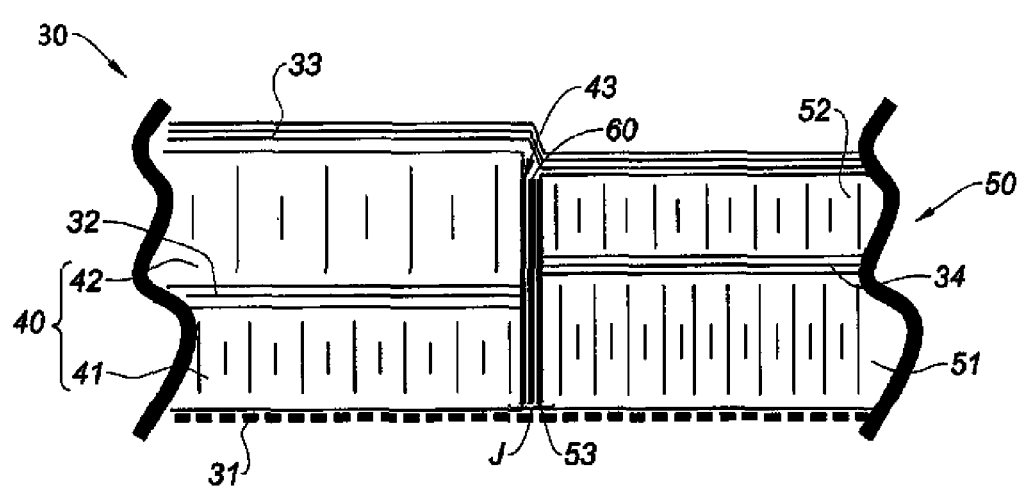
Fig. 3

METHOD FOR MANUFACTURING A SOUND ATTENUATION PANEL

CROSS-REFERENCE TO RELATED APPLICATIONS

This application is a continuation of International Application No. PCT/FR2012/051067, filed on May 14, 2012, which claims the benefit of FR 11/54808, filed on Jun. 1, 2011. The disclosures of the above applications are incorporated herein by reference.

FIELD

The present disclosure relates to the field of noise reduction for aircraft engines.

BACKGROUND

The statements in this section merely provide background information related to the present disclosure and may not constitute prior art.

Turbojet engines generate significant noise pollution. There is a strong demand to reduce the noise emitted by turbojet engines, particularly as the latter become increasingly powerful.

It is known that a significant portion of this noise is created in the air intake zone of the nacelle inside which the engine is housed. In that zone, there is an engine fan, which creates very strong suction and shearing noise from the air.

It is known in particular to form the walls of the nacelle with sound attenuation panels, so as to reduce the noise created in that zone.

These panels are typically made up of one or more cellular core layers (called "honeycomb" structure) whereof the outer face, i.e., the face radially furthest from the axis of the engine, is covered with a skin that is impermeable to the air, and the inner face of which, i.e., the face thereof radially closest to the axis of the engine, is covered with an air-permeable skin.

These sound attenuation panels may further comprise a multi-perforated skin, called a septum, between the different cellular core layers.

Each panel is assembled by positioning the different skins and cellular core layers glued on a mold having the required shape.

The assembly undergoes curing in a furnace so as to tighten the layers and polymerize the pieces.

Such panels form acoustic resonators capable of "trapping" the noise, and therefore attenuating the sound emissions toward the outside of the nacelle.

For reasons for example related to the geometry of the nacelle or structural constraints, it is often necessary to place several cellular core blocks end to end to form the sound attenuation panels.

More particularly, in reference to FIG. 1, the sound attenuation panels 1 are often formed by several cellular core structures 2, 3 placed end to end, with different thicknesses.

Examples for instance include an assembly of a first bilayer cellular core structure 2 and a second bilayer cellular core structure forming two blocks with different thicknesses intended to be joined in a junction area J, the assembly of the two blocks being covered by shared inner 4 and outer 5 skins.

These are then called distributed sound attenuation panels.

In this type of distributed sound attenuation panel, the different thickness of the two cellular core structures to be joined may be due to the size of the cells of the honeycomb layers and/or the number of cellular core layers of each structure to be joined.

In this type of panel, further, the acoustic properties, i.e., the noise absorption level as a function of the frequency and sound level of the noise, depend in particular on the joining of the cellular core structure(s).

In this case, the junction areas between the structures must be treated with very special care if one wishes to preserve good sound absorption and effectiveness of the distributed sound panels.

One common technique used to connect the cellular core structures to each other consists of coating the adjacent edges of the structures with a glue that turns into foam upon curing, and thereby forms a sort of connecting strip of expanded material between those edges.

The advantage of this technique is that it makes it possible to obtain a panel which, from a mechanical perspective, behaves as if it were made in a single block.

More particularly known is a method for manufacturing distributed sound panels in which, in reference to FIG. 2, a junction between two cellular core structures 20, 21 is provided by the presence of an intumescent adhesive 23.

However, the presence of such an intumescent element 23 generates a rupture in the acoustic treatment inasmuch as the cells of the honeycomb structures may be plugged by that adhesive 23, and the holes of the acoustic skins and septa, if applicable, may also be plugged by that adhesive 23.

Further known are methods without adhesive wherein, preferably at the edge-to-edge junction of the cellular core structures, the cells situated on the adjacent edges of the structures intended to be joined are opened, and those structures are joined edge-to-edge by fitting the open cells into one another.

Such a method does not guarantee good junctions in the context of sound attenuation panels formed on parts with a strong curvature, such as cylindrical nacelles.

It is then necessary to use outside indexing means to ensure the proper positioning of the different acoustic structures relative to one another, of the pencil on part type.

It also does not make it possible to prevent two septa of two respective adjacent cellular structures to be joined from overlapping in the junction area of the two structures.

This has the drawback of affecting the acoustic quality of the panel.

SUMMARY

The present disclosure provides a method for manufacturing a sound attenuation panel making it possible to obtain distributed sound panels in which the acoustic surface is improved and lighter distributed sound panels.

A method for manufacturing a sound attenuation panel that eliminates the use of outside indexing elements while offering better positioning of the cellular core structures of said panel relative to the mold and the panel resulting therefrom is also provided.

To that end, the present disclosure relates to a method for manufacturing a sound attenuation panel comprising a first cellular core structure and a second cellular core structure joined in a junction area, the first and second cellular core structures each comprising at least one cellular core layer, wherein:

a) a joining edge of the first cellular core structure having a cellular core is joined to a corresponding joining edge of the second cellular core structure having a cellular core, thereby forming the junction area;

b) the first cellular core structure having a cellular core and the second cellular core structure having a cellular core are placed between an inner skin and an outer skin of the panel, the method is remarkable in that it further comprises:

a step prior to step a), in which at least one junction reinforcement is inserted between the joining edge of the first cellular core structure having a cellular core and the corresponding joining edge of the second cellular core structure having a cellular core in the junction area, said reinforcement extending in a plane transverse to the two structures having a cellular core, and a subsequent step in which the first and the second cellular core structures and the junction reinforcement are secured together using a connecting means.

Owing to a method according to the present disclosure, and more particularly owing to the presence of a junction reinforcement at the interface between the two cellular core structures, a solid mechanical connection is offered between the two structures.

Advantageously, such a junction reinforcement performs an indexing abutment function to precisely position the different sounds structures relative to one another and the assembly relative to the manufacturing mold of the panel.

According to specific forms of the present disclosure, the method according to the present disclosure may include one or more of the following features, considered alone or in technically possible combinations:

The junction reinforcement is indexed and fixed on a mold;

The junction reinforcement is not pierced;

The height of the junction reinforcement is suitable for forming an abutment for the layers of each cellular core structure;

The height of the junction reinforcement is smaller than the sum of the thicknesses of the layers of each cellular core structure;

Such a junction reinforcement may be a pre-cured composite profile;

The composite profile may be the septum;

The septum may be formed from glass and epoxide plies;

An acoustic septum is inserted between the layers of one or each cellular core structure;

The connecting means is a gluing means; and

The gluing means is a film of glue applied on at least one of the two joining edges of the cellular core structures and/or on the junction reinforcement.

The present disclosure further relates to a sound attenuation panel manufactured using the aforementioned method.

Such a panel may be a distributed sound panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a cross-sectional view of a distributed sound attenuation panel according to one form of the prior art;

FIG. 2 is a cross-sectional photograph of a distributed sound attenuation panel according to another form of the prior art;

FIG. 3 is a partial cross-sectional diagrammatic view of a sound attenuation panel according to the present disclosure;

Figure 4A:
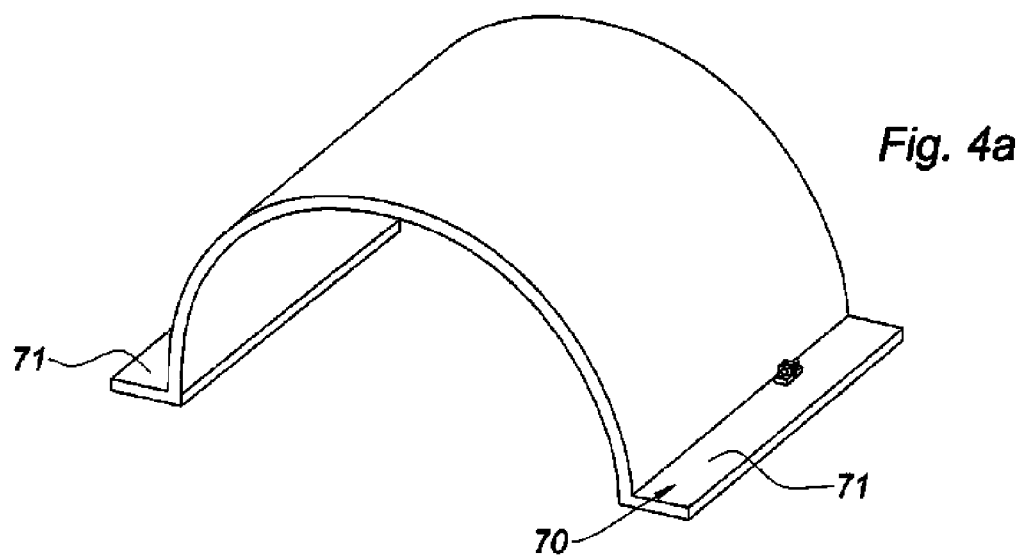
FIGS. 4a to 4f illustrate the different successive steps of the manufacturing method according to the present disclosure for a sound attenuation panel of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In reference to FIG. 3, a sound panel 30 typically comprises a first cellular core structure 40 and a second cellular core structure 50 that are joined in a junction area J, the first 40 and second 50 cellular core structures each comprising at least one cellular core layer.

The cellular core structures are sandwiched between a so-called acoustic inner skin 31 and a so-called solid outer skin 32, said to be solid because it does not comprise any holes.

Thus, relative to the first cellular core structure 40, the following successive layers can be seen in the direction of the thickness: the first acoustic skin 31, a primary honeycomb layer 41 of the first structure 40, a perforated septum 32, a secondary honeycomb layer 42 of the first structure 40 and the second solid skin 33.

The two primary and secondary honeycomb layers 41, 42 form the first cellular core structure 40 of the panel 30.

The honeycombs of these layers 41, 42 are traditionally made up of adjacent cells oriented in the direction of the thickness of the honeycomb.

Furthermore, the honeycomb of the secondary layer 42 may or may not be similar to the honeycomb of the primary layer 41.

Its thickness may thus be different, as may the width of the alveolar cells.

The material forming the cells of the layers 41, 42 may typically be made from a light metal alloy suitable for the aeronautics field or any other suitable material.

The septum 32 is made from an organic matrix composite material comprising one or more reinforcing plies embedded in resin.

It may also be pierced with holes following a particular mesh on which the acoustic quality of the panel 30 depends.

In one non-limiting alternative of the present disclosure, the material forming the inner skin 31 of the panel 30 may be made from sheet metal or fabric, and includes perforations situated across from the cells.

In one non-limiting alternative of the present disclosure, the material forming the outer skin 33 of the panel 30 may be a multilayer composite material.

The description in reference to the cellular layers of the first structure 40 is also valid for the second cellular core structure 50, which in this form also shows two cellular core layers 51, 52, between which an acoustic septum 34 is inserted.

The illustrated sound panel 30 is a distributed sound panel, as defined in the introduction to this present disclosure. Thus, more particularly, the two cellular core structures 40, 50 have a different thickness.

In this FIG. 3, the first cellular core structure 50 is thicker than the second, adjacent cellular structure 50.

The operating principle of such a sound panel is known in itself: this panel may be mounted, for example, in the inner wall of an aircraft nacelle such that the inner skin 31 is situated across from the engine in that nacelle.

The noise emitted by this engine penetrates the cells by means of orifices situated in the inner skin 31, and vibrates the inside of the cells, which form acoustic resonators, thereby making it possible to dissipate the acoustic energy and produce a subsequent reduction in the noise level.

According to alternative forms, it is possible to obtain a sound panel including more than two cellular core structures 40, 50, which in turn may comprise one or more layers.

Reference will more particularly be made to the junction area J between these two cellular core structures 40, 50 in which they cooperate.

According to the present disclosure, at least one junction reinforcement 60 is placed between the joining edge 43 of the first cellular core structure 40 and the corresponding joining edge 53 of the second cellular core structure 50 in the junction zone J.

This junction reinforcement 60 extends in a plane transverse to the layers of the two cellular core structures 40, 50, i.e., here perpendicular to the thickness of each of the structures 40, 50.

Such a junction reinforcement performs an indexing abutment function to precisely position the different sounds structures 40, 50 relative to one another and the assembly relative to the manufacturing mold of the panel, as will be seen below relative to FIGS. 4a to 4f.

To that end, reference will now be made to FIGS. 4a to 4f, in light of which the method for manufacturing the sound panel according to FIG. 3 will be described.

First, in reference to FIG. 4a, a draping mold 70 is chosen depending on the sound panel 30 to be manufactured.

In one non-limiting example, a mold of the OFS type has been chosen having two corners 71 at each free end of the mold 70, this mold 70 being in the shape of an arc of circle.

In a following step, the first acoustic skin 31 of the sound panel 30 is placed on the mold 70.

Figure 4B:
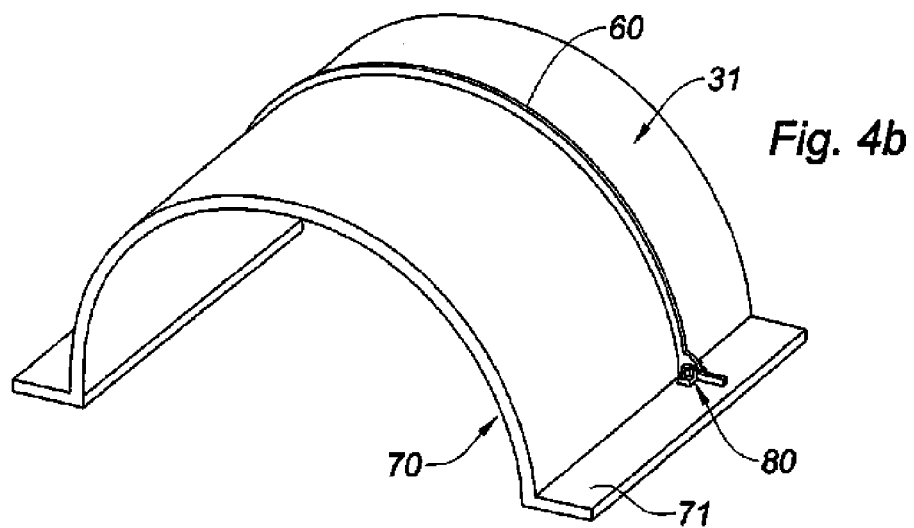

As illustrated in FIG. 4b, the junction reinforcement 60 is next indexed on the first acoustic skin 31, which will delimit the interface between the two acoustic structures 40, 50 of the panel 30.

Such a junction reinforcement 60 is not pierced, and its thickness is suitable for imparting stiffness to the junction J between the two cellular core structures 40, 50.

Furthermore, the height of the junction reinforcement 60 is chosen so as to allow the reinforcement 60 to form a lateral abutment for all of the layers 41, 42 and 51, 52 forming the two cellular core structures 40, 50 to be joined.

Figures 5A, 5B, 5C:
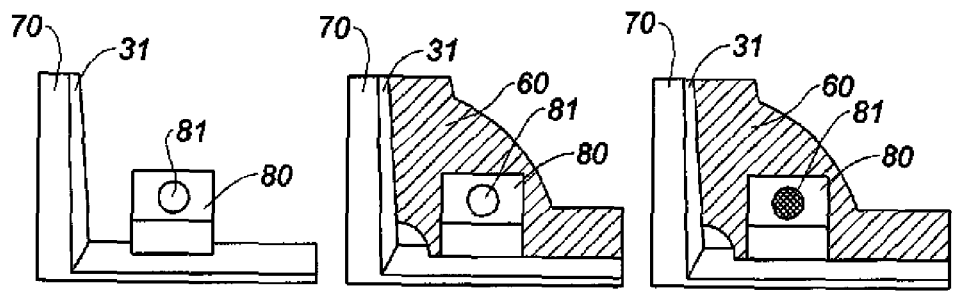
FIGS. 5a to 5c are cross-sectional views of the step for placing a septum on a mold of the manufacturing method according to the present disclosure.

As illustrated in this figure and in reference to FIGS. 5a to 5c, the junction reinforcement 60 extends over the circumference of the mold 70 and the first skin 31, radially protruding from the mold 70 as far as the corners 71, where it is securely fixed by suitable means 80.

More specifically, the reinforcement 60 is fixed, at both of its ends, in a housing and centered owing to the cooperation of centering and positioning means suitable for passing through the through orifices 81, facing each other, formed in the fastening means 80 and the reinforcement 60.

In one form of the present disclosure, the junction reinforcement is a composite profile.

In another form, this profile is pre-cured. In one form, this profile is a septum 60.

In one non-limiting example of the present disclosure, such a septum is formed from a material of the glass and epoxide ply type.

Preferably, such a profile has a small thickness, i.e., said thickness is smaller than the size of one honeycomb alveolar cell.

Furthermore, the reinforcement or junction septum 60 will be joined to the different cellular core structures 40, 50 by suitable connecting means, as described later. In one form, the connecting means is a gluing means.

This gluing means may be a film of glue (which may or may not be supported) applied on at least one of the two joining edges of the cellular core structures 40, 50 and/or on the septum 60.

In one alternative form, the septum 60 may be pre-coated with an adhesive in the form of a film, before being indexed on the mold 70.

In a second alternative, it may be coated on the mold 70 after indexing thereof.

Figure 4C:
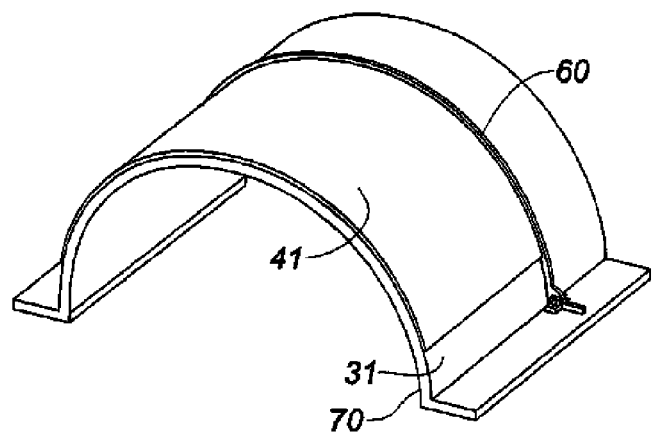
Figure 4D:
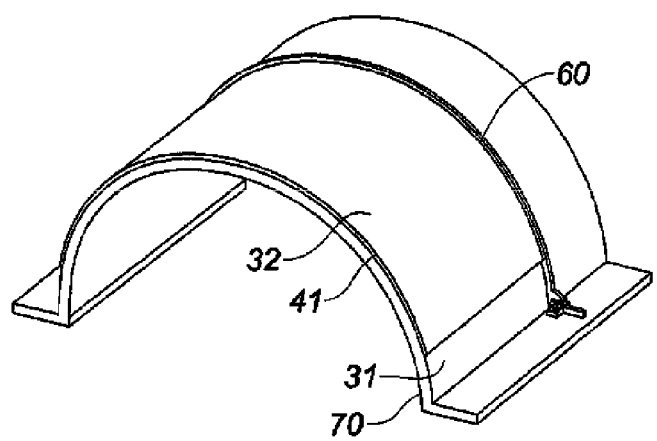
Figure 4E:
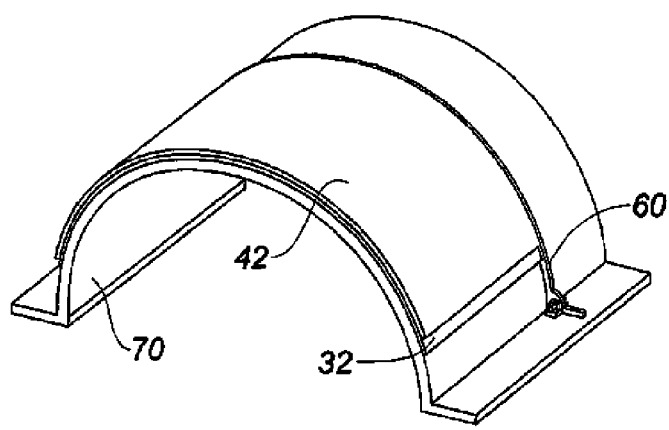

In reference to FIGS. 4c to 4e, the first cellular core structure 40 and the second cellular core structure 50 are successively deposited on the acoustic skin 31, on either side of the junction septum 60, the figures only illustrating the placement of the first structure 40.

Thus, a first acoustic structure layer 41, 51 is deposited on either side of the junction septum 60, on the first acoustic skin 31 (FIG. 4c).

The acoustic septa 32, 34 are deposited, if applicable, on the layer(s) 41, 51 of the cellular core structures 40, 50 (FIG. 4d).

A second layer 42, 52 is subsequently placed for the cellular core structures 40, 50, if applicable.

Figures 6A, 6B:
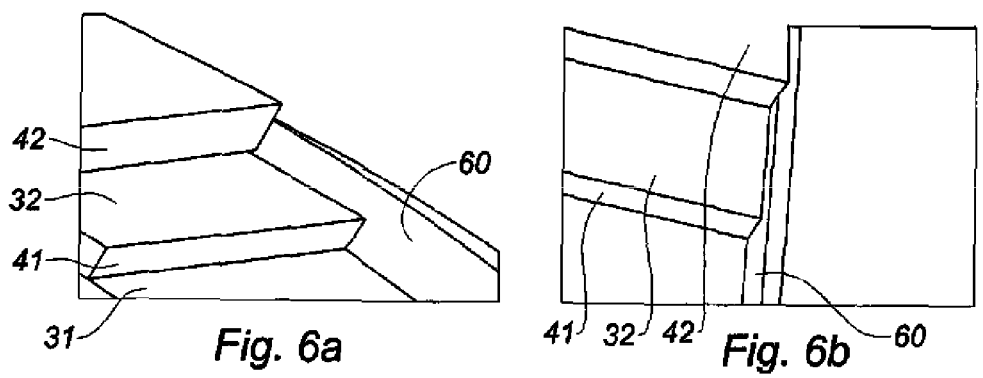
FIGS. 6a and 6b are two perspective views of different successive layers of a panel according to FIG. 3.

In this type of sound panel 30 production, as illustrated in FIGS. 6a and 6b, the junction septum 60 forms a lateral abutment for each acoustic layer 41, 51, 42, 52 deposited on the mold 70 and the acoustic septa 32, if applicable.

However, to avoid deteriorating and indenting the outer skin 33 of the distributed sound panel, the junction septum 60 has a height smaller than the sum of the thicknesses of the different layers of each cellular core structure 40, 50, i.e., the sum of the thicknesses, here, of the first layer 41, the acoustic septum 32 and the second layer 42 regarding the first cellular core structure 40.

Figure 4F:
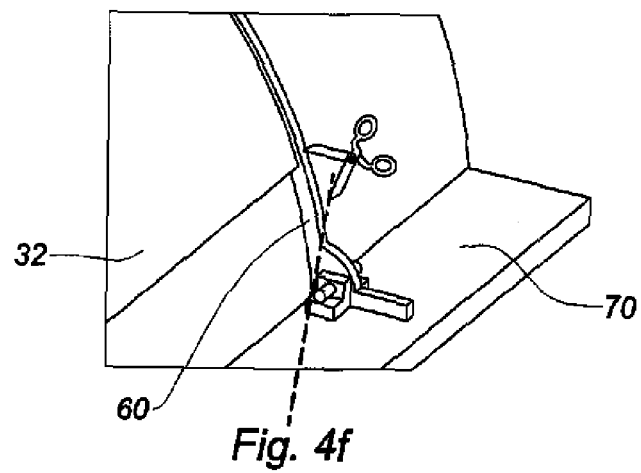

In a subsequent step illustrated in FIG. 4f, the junction septum 60 is cut at both of its ends, freeing it from the corners.

The outer skin 32 is subsequently placed on the assembly of the cellular core structures, said outer skin covering all of the layers of the two cellular core structures 40, 50, as well as the junction J and the transverse septum 60.

It should be noted that between each layer deposition, the junction may be made by applying a film of glue (which may or may not be supported), as was mentioned for the junction of the joining edges 43, 53 of the two cellular core structures with the junction septum 60.

In a final step that is not illustrated, the various resins and glues of the panels 30 are polymerized to obtain the sound panel illustrated in FIG. 3.

This polymerization may be done, in a non-limiting example, under pressure owing to compacting by a bladder or any other suitable means.

Owing to the present disclosure, a means is proposed for joining the acoustic structures of a distributed sound panel using an element placed on their junction axis, that element making it possible both to generate a thin mechanical connection between the two acoustic areas and to serve as an abutment to position the acoustic structures 40, 50 precisely relative to one another.

The manufactured panels are also lightened, and the acoustic surfaces improved.

Furthermore, the presence of a junction septum 60 makes it possible to provide better positioning of the panel 30 to be manufactured relative to the mold 70 used.

Of course, the present disclosure is in no way limited to the forms described above, provided a simple examples, but also encompasses all alternative forms of the present disclosure.

In particular, it is possible to consider other connecting and gluing means or types of panels other than distributed sound panels.

What is claimed is:

1. A method for manufacturing a sound attenuation panel comprising a first cellular core structure and a second cellular core structure joined in a junction area (J), the first and second cellular core structures each comprising at least one cellular core layer, wherein:
a) a joining edge of the first cellular core structure having a cellular core is joined to a corresponding joining edge of the second cellular core structure having a cellular core, thereby forming the junction area;
b) the first cellular core structure and the second cellular core structure are placed between an inner skin and an outer skin of the panel, wherein the method further comprises:
a step prior to step a), in which at least one junction reinforcement is inserted between the joining edge of the first cellular core structure and the corresponding joining edge of the second cellular core structure in the junction area, said junction reinforcement extending in a plane transverse to the first and the second cellular core structures, and a subsequent step in which the first and second cellular core structures and the junction reinforcement are secured together using a connecting means, and wherein the junction reinforcement is indexed and fixed on a mold.

2. The method according to claim 1, wherein the junction reinforcement is not pierced.

3. The method according to claim 1, wherein the height of the junction reinforcement is suitable for forming an abutment for layers of each cellular core structure.

4. The method according to claim 3, wherein the height of the junction reinforcement is smaller than the sum of the thicknesses of the layers of each cellular core structure.

5. The method according to claim 1, wherein the junction reinforcement is a pre-cured composite profile.

6. The method according to claim 5, wherein the pre-cured composite profile is a septum.

7. The method according to claim 6, wherein the septum is formed from glass and epoxide plies.

8. The method according to claim 1, wherein an acoustic septum is inserted between the layers of one or each cellular core structure.

9. The method according to claim 1, wherein the connecting means is a gluing means.

10. The method according to claim 9, wherein the gluing means is a film of glue applied on at least one of the two joining edges of the cellular core structures and/or on the junction reinforcement.

11. A sound attenuation panel manufactured using the method according to claim 1.

12. The sound attenuation panel according to claim 11, wherein the sound attenuation panel is a distributed sound panel.

\* \* \* \* \*